United States Patent
DiMassimo et al.

(10) Patent No.: US 9,630,865 B2
(45) Date of Patent: Apr. 25, 2017

(54) SYSTEM AND PROCESS FOR REMOVING AMMONIUM, SOLUBLE BOD AND SUSPENDED SOLIDS FROM A WASTEWATER STREAM

(71) Applicant: Veolia Water Solutions & Technologies Support, Saint-Maurice (FR)

(72) Inventors: Richard W. DiMassimo, Raleigh, NC (US); Michael L. Gutshall, Holly Springs, NC (US); Abdelkader Gaid, Paris (FR); Sandra Bernard, Birmingham (GB)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 597 days.

(21) Appl. No.: 13/897,771

(22) Filed: May 20, 2013

(65) Prior Publication Data

US 2014/0339158 A1    Nov. 20, 2014

(51) Int. Cl.
| | | |
|---|---|---|
| *C02F 1/24* | (2006.01) | |
| *C02F 3/12* | (2006.01) | |

(Continued)

(52) U.S. Cl.
CPC ............. *C02F 3/1226* (2013.01); *B01J 39/14* (2013.01); *B01J 47/026* (2013.01);
(Continued)

(58) Field of Classification Search
CPC .... C02F 1/281; C02F 3/12; C02F 9/00; C02F 1/52; C02F 1/5236; C02F 1/586;
(Continued)

(56) References Cited

U.S. PATENT DOCUMENTS 4,622,166 A * 11/1986 Nakazawa et al. ............. 516/79
7,108,784 B1    9/2006 Litz et al.
(Continued)

FOREIGN PATENT DOCUMENTS

AU    2008201191 A1    10/2009
JP    H11244884 A     9/1999
(Continued)

*Primary Examiner* — Nam Nguyen
*Assistant Examiner* — Claire Norris
(74) *Attorney, Agent, or Firm* — Coats and Bennett PLLC

(57) ABSTRACT

A method of treating wastewater includes removing BOD and ammonium from the wastewater. The wastewater is directed into a tank where it is mixed with mixed liquor or activated sludge from an activated sludge wastewater treatment system. The mixture of wastewater and mixed liquor or activated sludge forms a mixed liquor stream. The mixed liquor stream is directed to a ballasted flocculation system where suspended solids is removed from the wastewater. This produces a clarified effluent that is directed to a zeolite tank. Clarified wastewater from the ballasted flocculation system is directed into the zeolite tank and mixed with zeolite. Zeolite is effective to remove ammonium from the wastewater. Thus, the process as a whole is effective in removing suspended solids, soluble BOD as a result of mixing the mixed liquor or activated sludge with the wastewater, and ammonium.

6 Claims, 3 Drawing Sheets

(51) Int. Cl.
*B01J 39/14* (2006.01)
*B09C 1/00* (2006.01)
*C02F 9/00* (2006.01)
*B01J 47/026* (2017.01)
*B01J 49/00* (2017.01)
*C02F 1/28* (2006.01)
*C02F 103/00* (2006.01)
*C02F 1/38* (2006.01)
*C02F 1/52* (2006.01)
*C02F 3/02* (2006.01)
*C02F 1/00* (2006.01)
*C02F 1/42* (2006.01)
*C02F 101/16* (2006.01)

(52) U.S. Cl.
CPC ....... *B01J 49/0008* (2013.01); *B01J 49/0069* (2013.01); *B01J 49/0082* (2013.01); *B09C 1/002* (2013.01); *C02F 9/00* (2013.01); *C02F 1/281* (2013.01); *C02F 1/385* (2013.01); *C02F 1/5263* (2013.01); *C02F 1/5281* (2013.01); *C02F 3/02* (2013.01); *C02F 2001/007* (2013.01); *C02F 2001/425* (2013.01); *C02F 2101/16* (2013.01); *C02F 2103/001* (2013.01); *C02F 2303/16* (2013.01); *C02F 2305/12* (2013.01); *Y02W 10/15* (2015.05)

(58) Field of Classification Search
CPC .......... C02F 2001/007; C02F 2001/425; C02F 2209/08; C02F 2305/12; C02F 3/1215; C02F 3/1226
USPC ........ 210/638, 702, 660, 703, 749, 670, 712
See application file for complete search history.

(56) References Cited

U.S. PATENT DOCUMENTS 7,323,108 B1 * 1/2008 Garbett et al. ................ 210/607
2007/0163955 A1 7/2007 Sun

FOREIGN PATENT DOCUMENTS

| WO | 8504390 | A1 | 10/1985 |
| WO | 0047525 | A1 | 8/2000 |
| WO | 0244094 | A1 | 6/2002 |

* cited by examiner

SYSTEM AND PROCESS FOR REMOVING AMMONIUM, SOLUBLE BOD AND SUSPENDED SOLIDS FROM A WASTEWATER STREAM

FIELD OF THE INVENTION

The present invention relates to wastewater treatment systems and more particularly to wastewater treatment systems designed to remove ammonium, soluble BOD and suspended solids.

SUMMARY OF THE INVENTION

The present invention entails a process for treating wastewater to remove ammonium, soluble BOD and suspended solids. In one embodiment, wastewater is directed to a contact tank. Mixed liquor or activated sludge from a separate activated sludge system is fed into the contact tank and mixed with the wastewater. This produces a mixture of wastewater and activated sludge or mixed liquor, and the mixture is referred to as a mixed liquor stream. The mixed liquor stream is directed through a ballasted flocculation system. Since mixed liquor or activated sludge is in contact with the wastewater being treated, soluble BOD is biologically removed from the wastewater. Further, the ballasted flocculation system is effective to remove suspended solids. A clarified effluent is produced by the ballasted flocculation system. This clarified effluent is directed into a zeolite tank and mixed with zeolite particles. The zeolite is effective in removing ammonium from the wastewater. The mixture of clarified effluent and zeolite is subjected to a solids-liquid separation process which separates the zeolite from the liquid portion of the clarified effluent. This solids-liquid separation process produces a second clarified effluent. In one embodiment, the separated zeolite is recycled to the zeolite tank and, in some cases, a portion of the zeolite is subjected to a regeneration process and the regenerated zeolite is recycled back to the zeolite tank.

In another embodiment, the zeolite is utilized as a ballast in the ballasted flocculation system. In this case also, the zeolite functions to remove ammonium from the wastewater. At the same time, the zeolite, provided in the form of particles, is utilized to facilitate the settling of suspended solids or sludge. Here the suspended solids agglomerate around the zeolite particles and this results in the relatively heavy zeolite particles and suspended solids settling at a relatively fast rate. In this embodiment, the wastewater is also directed to the contact tank where mixed liquor or activated sludge from a separate activated sludge system is mixed with the wastewater to form the mixed liquor stream. It is the mixed liquor stream with the biomass included that is directed to the ballasted flocculation system where the zeolite is used as a ballast.

In another embodiment, the present invention is primarily used in wet weather conditions and in conjunction with a separate activated sludge system. Here, a main wastewater influent stream is directed into and through the activated sludge system and produces a clarified effluent. In some cases, the activated sludge system does not have the capacity to handle excess water resulting from wet weather events. In this case, the process entails a wastewater treatment system that operates parallel to the existing activated sludge system and which is designed to handle at least a substantial portion of the water attributable to wet weather events. This additional wastewater treatment system includes the contact tank for receiving activated sludge or mixed liquor from the activated sludge system. The water resulting from the wet weather condition is directed into the contact tank and mixed with the activated sludge or the mixed liquor from the separate activated sludge system. This produces the mixed liquor stream which is then directed to a ballasted flocculation system. Between the contact tank and the ballasted flocculation system, soluble BOD is removed from the wastewater because of the presence of biomass in the wastewater. At the same time, the ballasted flocculation system is effective to remove suspended solids. As noted above, a downstream process utilizing zeolite can be employed to remove ammonium from the wastewater or, in the alternative, the zeolite can be utilized as a ballast in the ballasted flocculation system. In the latter case, the zeolite functions to remove ammonium and serve as a ballast that facilitates the removal of suspended solids from the wastewater.

Other objects and advantages of the present invention will become apparent and obvious from a study of the following description and the accompanying drawings which are merely illustrative of such invention.

EXEMPLARY EMBODIMENTS OF THE INVENTION

With further reference to the drawings, the wastewater treatment system of the present invention is shown therein and indicated generally by the numeral 10. As discussed above, the system of the present invention is designed to remove soluble BOD, suspended solids and ammonia from wastewater. In particular, when ammonia, $NH_3$, is hydrated, it forms ammonium, $NH_4^+$. The system and process of the present invention entails contacting the wastewater with zeolite and through an ion exchange process and/or adsorption, the ammonium ion is removed from the wastewater. In one embodiment of the present invention, the system and process disclosed herein is particularly useful to deal with wet weather events and conditions. In this case, the system and process involves a main activated sludge system 12 that receives a main wastewater influent and produces a clarified effluent. In some cases, such an activated sludge system 12 does not have the capacity to handle excess water produced by a wet weather event. The present invention entails a system and process for dealing with this excess water in such a way that soluble BOD, suspended solids and ammonium can be removed from the excess water without the excess water being required to pass through the activated sludge system 12. This is accomplished by providing a parallel treatment system, that is a system that is operated parallel to the activated sludge system 12. As described below, the parallel system and process utilizes activated sludge from the activated sludge system to biologically treat the excess water passing in the system that runs parallel to the activated sludge system 12. By utilizing activated sludge from the activated sludge system 12, soluble BOD is biologically removed from the water. At the same time, the present invention envisions that suspended solids can be removed from this excess water and still further ammonium in the excess water produced by the wet weather event can be removed. It should be pointed out that the present invention is not limited to simply handling excess water from wet weather conditions or events. The system and process of the present invention may be used to effectively increase the capacity of an existing activated sludge system.

Figure 1:
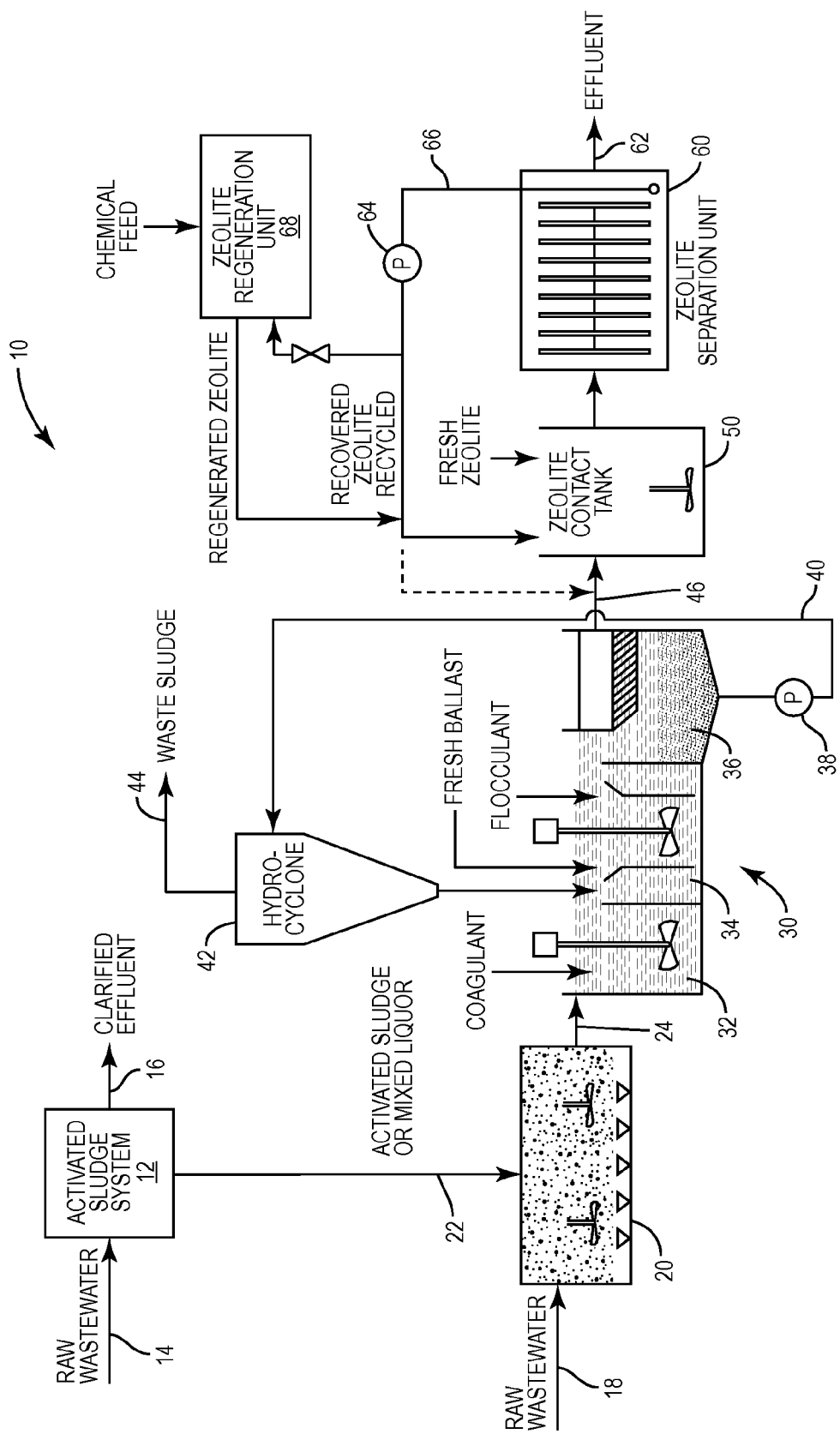
FIG. 1 is a schematic illustration of the system and process of the present invention.

Turning to FIG. 1, there is shown therein an activated sludge system 12. Note influent line 14 that directs raw wastewater to be treated into the activated sludge system 12. The raw wastewater is treated in any one of a variety of ways in the activated sludge system 12 and the system produces a clarified effluent that passes therefrom through effluent line 16. Activated sludge system 12 produces return activated sludge, waste activated sludge and produces what is referred to as mixed liquor. Mixed liquor is formed when return activated sludge is mixed with incoming wastewater to be treated. Activated sludge system 12 includes one or more reactors that are utilized to biologically treat the wastewater and further includes a solids-liquid separation unit such as a clarifier or a membrane separation unit, for example. Other types of solids-liquid separation units can be employed. As noted above, the activated sludge system 12 relies on biomass to remove contaminants and treat the wastewater passing in the system. Various biological wastewater treatment processes can be carried out by the activated sludge system 12. For example, biological processes for removing soluble BOD, phosphorus, heavy metals and biological processes to nitrify and denitrify the wastewater can be employed in the activated sludge system 12.

As noted above, the present invention entails a wastewater treatment process that is operated in parallel with the activated sludge system 12. As seen in FIG. 1, there is provided another wastewater influent line 18. Raw wastewater to be treated is directed through line 18 into a bio-contact tank 20. Bio-contact tank 20 includes a mixer and is aerated to enhance and maintain biological treatment. Connected between the activated sludge system 12 and the bio-contact tank 20 is an activated sludge feedline 22. Activated sludge feedline 22 is operative to direct activated sludge from the activated sludge system 12 into the bio-contact tank 20. It should be appreciate that the activated sludge directed from the system 12 into the bio-contact tank 20 can assume various forms. It may be in the form of return activated sludge, waste activated sludge or may be in the form of mixed liquor. In any event, the activated sludge is mixed with the incoming wastewater from line 18 and this produces what is referred to as a mixed liquor stream which is directed via line 24 to a ballasted flocculation system indicated generally by the numeral 30.

Figure 2:
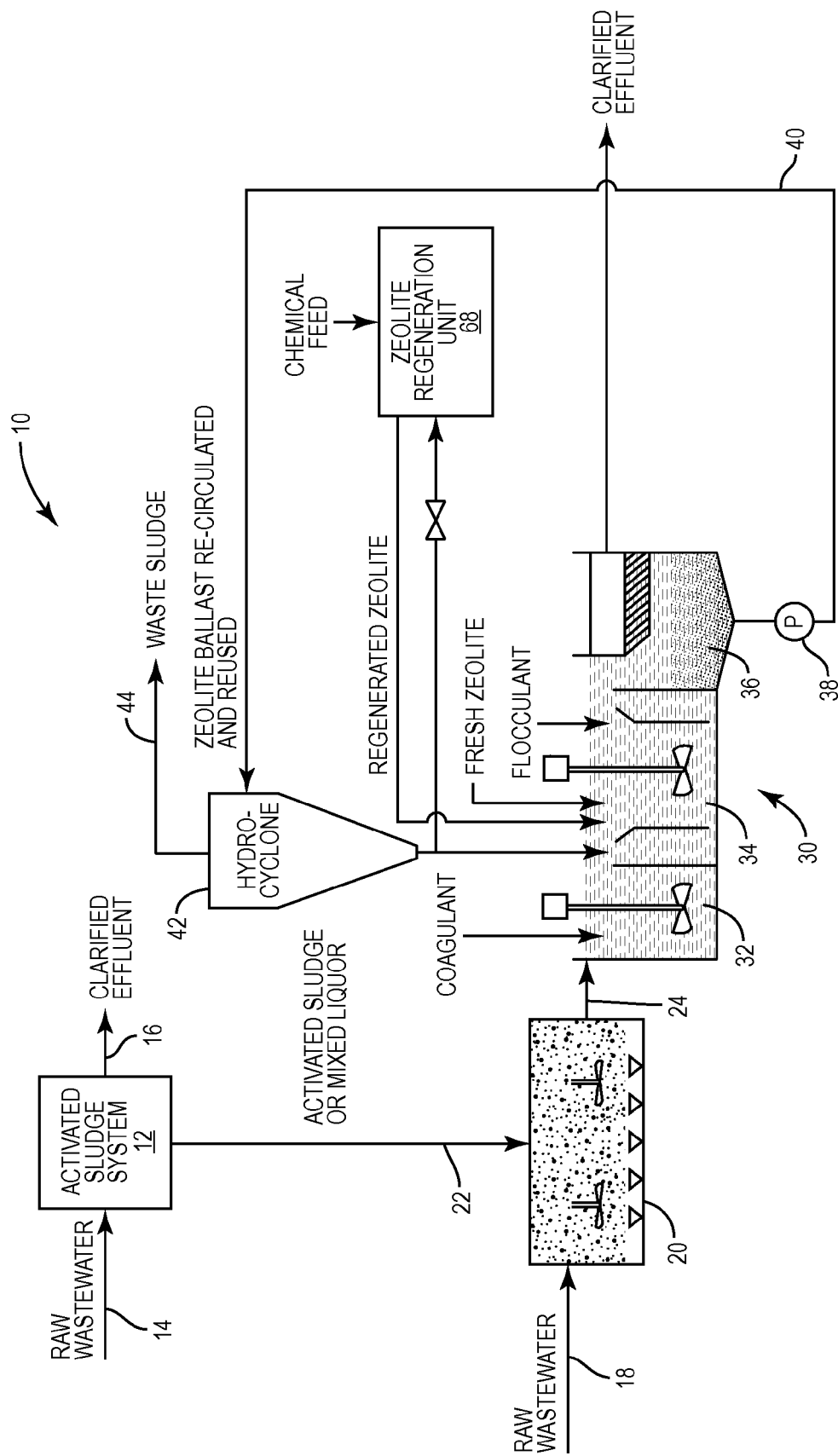
FIG. 2 is a schematic illustration of an alternative process where zeolite is utilized in a ballasted flocculation system as a ballast which is effective to remove ammonium and which also facilitates the removal of suspended solids from the wastewater being treated.

In the case of the embodiment shown in FIG. 1, the ballasted flocculation system 30 includes tanks 32 and 34 along with a settling tank 36. Both tanks 32 and 34 include a mixer. Disposed in tank 34 is a downdraft mixing tube that is utilized to mix a flocculant with the wastewater in tank 34. Upstream a coagulant can be mixed with the wastewater in tank 32 or even at a point upstream of tank 32. Sludge settles to the bottom of settling tank 36 and a pump 38 is utilized to pump the sludge to a hydrocyclone 42. The ballasted flocculation system 30 is operative to inject a ballast into the mixed liquor stream passing through the ballasted flocculation system 30. Various types of ballast can be used. In one embodiment, the ballast is microsand and, as will be discussed subsequently herein and as shown in FIG. 2, the ballast may comprise zeolite particles. In any event, the sludge that settles to the bottom of settling tank 36 is pumped by pump 38 to the hydrocyclone 42. Hydrocyclone 42 separates the sludge from the ballast and recycles the ballast to the second tank 34 of the ballasted flocculation system 30. The separated sludge is directed as waste sludge from the hydrocyclone 42 via line 44.

Ballasted flocculation system 30 produces a clarified effluent that is directed therefrom via line 46. This clarified effluent is directed to a zeolite contact tank 50. Fresh or recycled zeolite is injected into the zeolite tank 50 and mixed with the clarified effluent. This contact time can vary depending on the concentration of ammonia in the water and the makeup and quality of the zeolite particles. In any event, the zeolite particles contact the clarified effluent and through an ion exchange process and/or an adsorption process, ammonia is reduced as a result of ammonium ions being taken up by the zeolite particles.

From the zeolite contact tank 50, the clarified effluent is directed to a zeolite separation unit 60 which separates the zeolite from the clarified effluent, producing an effluent having substantially no zeolite included. Various types of zeolite separation units can be employed. For example, filtration devices or settling devices can be used. Alternatively, rotary disc filters or rotary drum filters can be utilized to separate the zeolite particles from the clarified effluent. For a complete understanding of rotary disc filters and rotary drum filters one is referred to the disclosures found in U.S. Pat. No. 7,597,805 and U.S. patent application Ser. No. 13/164,863, the disclosures of which are expressly incorporated herein by reference.

Separated zeolite is pumped by pump 64 via line 66 from the zeolite separation unit 60. Zeolite is returned to the zeolite contact tank 50 or to a point upstream of the zeolite contact tank as indicated in dotted line in FIG. 1. From time to time, the zeolite particles will need to be regenerated. As shown in FIG. 1, there is provided a line with an associated valve for directing some of the recovered zeolite particles to a zeolite regeneration unit 68. There is provided a chemical feed that is directed into the zeolite regeneration unit for regenerating or rejuvenating the zeolite particles. Regenerated zeolite particles are directed from the regeneration unit 68 back to the zeolite contact tank 50 or to a point just upstream of the zeolite contact tank. There are various ways to regenerate the zeolite particles. In one example, the zeolite particles can be contacted with a sodium chloride solution at an appropriate pH of approximately 10. During the course of regeneration, sodium ions displace ammonium ions and other cations taken up or adsorbed during the wastewater treatment process.

Turning to FIG. 2, the process shown therein is similar to that discussed above and depicted in FIG. 1. The basic differences in the two processes is that in the case of the FIG. 2 process zeolite is also used as a ballast. By utilizing zeolite as a ballast as opposed to microsand, for example, the zeolite performs the dual function of reducing the ammonium concentration in the mixed liquor stream passing through the ballasted flocculation system 30 and at the same time facilitates the removal of suspended solids. As shown in FIG. 2, fresh zeolite is injected into the second tank 34 and mixed with a flocculant. In the process, ammonium ions are attracted to the zeolite particles through either an ion exchange process and/or an adsorption process. Thus, the mixing of the zeolite with the mixed liquor stream results in the up-take of ammonium and, hence, the reduction in ammonia in the mixed liquor stream. At the same time, suspended solids will agglomerate around the particles of zeolite and will grow into floc. Because the specific gravity of zeolite particles is greater than the specific gravity of water (typically approximately 1.7 to approximately 2.2), then it follows that the zeolite particles having ammonium ions and suspended solids attached thereto will settle relatively fast in the settling tank 36. Settled zeolite particles and other sludge is pumped by pump 38 through line 40 to the hydrocyclone 42 which separates the ballast or zeolite particles from waste sludge. Waste sludge is conveyed from the hydrocyclone 42 via line 44. Cleaned zeolite particles are then directed from the hydrocyclone into the second tank 34 of the ballasted flocculation system. It is appreciated that from time to time the zeolite particles will need to be regenerated. Thus, from time to time a portion of the cleaned zeolite particles leaving the hydrocyclone 42 is directed to the zeolite regeneration unit 68. Here the zeolite particles are regenerated in order to improve their affinity for ammonium ions.

Figure 3:
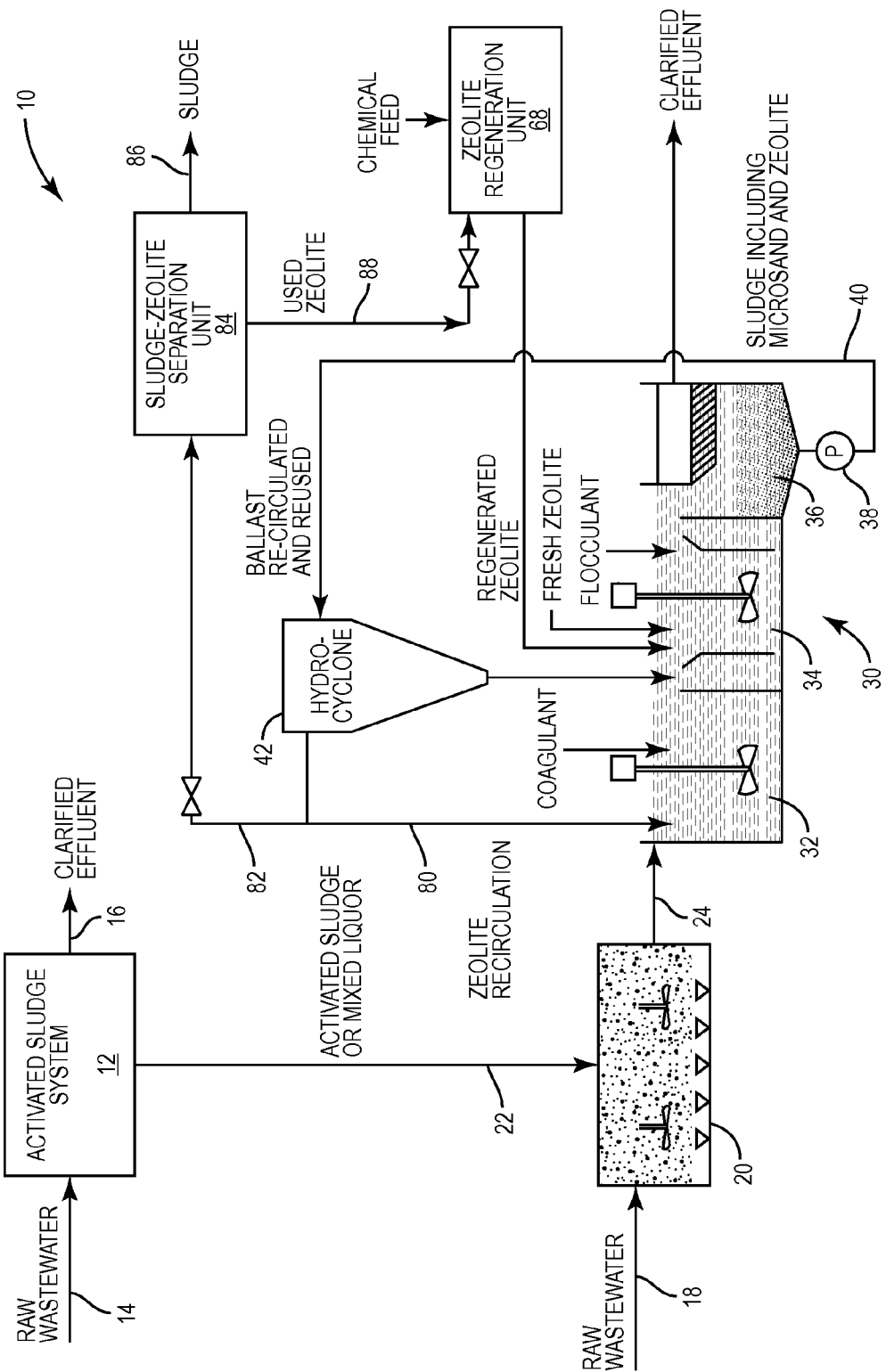
FIG. 3 shows an alternative process where both microsand and zeolite are mixed with the wastewater being treated.

FIG. 3 shows another embodiment of the present invention. The FIG. 3 embodiment is similar to the process described and shown in FIG. 2. However, in the FIG. 3 process microsand is used as a ballast so long as the ammonia or ammonium concentration of the influent wastewater stream is below a threshold limit. When the threshold limit is exceeded, then the process of the present invention injects zeolite into the second tank 34. Thus, in this embodiment, during certain periods of operation the process may include both microsand and zeolite. In this case, both microsand and zeolite function as a ballast to facilitate removing suspended solids from the influent wastewater being treated. Zeolite particles injected into the ballasted flocculation system function as described above to reduce the concentration of ammonia by removing through ion exchange or adsorption ammonium ions in the wastewater. Thus, it follows that the system and process shown in FIG. 3 can be controlled to selectively utilize zeolite particles in the process when there is a need to remove ammonium ions. When there is no need or compelling reason to remove ammonium ions, then the system and process can be operated by utilizing microsand or other conventional ballast material to facilitate settling and removing suspended solids.

Referring to FIG. 3, when both microsand and zeolite are injected into the ballasted flocculation system, it follows that the sludge produced in settling tank 38 will include both microsand and zeolite. Pump 38 is operative to pump the sludge including the microsand and zeolite through line 40 to a separator which in the case illustrated comprises a hydrocyclone 42. Hydrocyclone 42 is effective in separating microsand from sludge and the zeolite particles. Because of the nature and physical characteristics of the microsand, zeolite and sludge, the underflow produced by the hydrocyclone will generally include the microsand. The microsand separated by the hydrocyclone 42 is directed downwardly into the second tank 34 as shown in FIG. 3. The overflow produced by the hydrocyclone 42 includes the sludge and zeolite. This overflow can be directed into line 80 or line 82 from the hydrocyclone 42. See FIG. 3. More particularly, the sludge-zeolite mixture can be recycled through line 80 to the first tank 32 of the ballasted flocculation system 30. In other cases, the sludge-zeolite mixture can be directed into line 82. In some cases, it is envisioned that the overflow including the sludge-zeolite mixture can be split with one portion of the mixture recycled to the ballasted flocculation system 30 via line 80 and the other portion directed into line 82. The sludge-zeolite mixture directed into line 82 is directed to a sludge-zeolite separation unit 84. The purpose of the sludge-zeolite separation unit 84 is to separate the zeolite from the sludge. Separated sludge is directed from the separation unit 84 via line 86 where it is wasted or subjected to further treatment. The separated zeolite, termed used zeolite, is directed into line 88 which is effective to convey the used zeolite to the zeolite regeneration unit 88. As discussed before, the zeolite regeneration unit 88 is effective to regenerate or rejuvenate the used zeolite such that it can be returned to the ballasted flocculation system and reused. In some cases, the used zeolite produced by the sludge-zeolite separation unit 84 has sufficient ion exchange capacity that regeneration is unnecessary. In this case, as an alternative, the used zeolite produced by the separation unit 84 can be directly recycled to the second tank 34 without being treated by the zeolite regeneration unit 88.

Zeolite is a naturally occurring mineral, but it also can be synthetically manufactured. Two of the most common natural forms of zeolite are clinoptilolite and mordenite. In one embodiment of the present invention, the selected zeolite is clinoptilolite. There are many varieties of zeolite but generally zeolites are porous structures that include a variety of cations loosely held and which can be rather easily exchanged with other cations such as ammonium, $NH_4^+$. Natural zeolites are hydrated aluminosilicates. They consist of an open, three-dimensional cage-like structure in a network of open channels extending throughout. Loosely bound, positively charged cations are attached at the junctures of the negatively charges aluminosilicate lattice structure. The aluminosilicate framework provides substantial strength and stability to the lattice structure.

Particle sizes of zeolite can vary. It is contemplated that in one embodiment of the present invention that the zeolite particles used in either the process depicted in FIG. 1 or the process in FIG. 2 would range in size from approximately 100 to approximately 150 microns. It is contemplated that zeolite particles of this particle size will be effective in substantially reducing the ammonia concentration in the wastewater being treated.

Ammonia is a nutrient that contains nitrogen and hydrogen. Its chemical formula is $NH_3$ in an un-ionized state and $NH_4^+$ in the ionized form. Total ammonia is the sum of both $NH_3$ and $NH_4^+$. In removing ammonia from wastewater, an ammonia molecule ($NH_3$) is hydrated and this reaction produces ammonium ($NH_4^+$) which is readily exchanged for all or part of the calcium, potassium and magnesium contained in the zeolite particle. It is typical in wastewater treatment to measure ammonia in terms of ammoniacal nitrogen, $NH_3$—N. Typically in an example where the wastewater influent results from wet weather conditions, one would expect the concentration of $NH_3$—N to be on the order of 5-30 mg/L. Use of zeolite as envisioned herein substantially reduce the ammoniacal nitrogen concentration of the wastewater being treated.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of removing soluble BOD and ammonium from wastewater comprising:
   a. directing mixed liquor or activated sludge from an activated sludge system to a tank;
   b. directing the wastewater to be treated to the tank and mixing the wastewater with the mixed liquor or activated sludge to form a mixed liquor stream;

c. directing the mixed liquor stream to a ballasted flocculation system;
d. injecting zeolite ballast into the mixed liquor stream in the ballasted flocculation system and mixing the zeolite ballast with the mixed liquor stream;
e. biologically removing the soluble BOD in the mixed liquor stream in the ballasted flocculation system;
f. removing ammonium from the mixed liquor stream through an ion exchange process where ions associated with the zeolite ballast are replaced by ammonium;
g. removing suspended solids from the mixed liquor stream in the ballasted flocculation system by causing suspended solids in the mixed liquor stream to agglomerate around the zeolite ballast;
h. separating the zeolite ballast having the ammonium ions and suspended solids associated therewith from the mixed liquor stream and producing a clarifying effluent;
i. injecting microsand into the mixed liquor stream, and wherein both microsand and zeolite function as a ballast to facilitate the settling of suspended solids;
j. wherein the ballasted flocculation system includes a settling tank and wherein the method includes:
  settling sludge in the settling tank wherein the sludge includes microsand and zeolite;
  separating the microsand from the sludge and zeolite;
  directing the separated microsand into the ballasted flocculation system; and
  recycling the sludge and zeolite or directing the sludge and zeolite to a sludge-zeolite separation unit and separating the zeolite from the sludge; and
k. directing at least a portion of the separated zeolite to a zeolite regeneration unit and regenerating the zeolite; and returning at least a portion of the regenerated zeolite to the ballasted flocculation system.

2. A method of removing soluble BOD and ammonium from wastewater comprising:
a. directing mixed liquor or activated sludge from an activated sludge system to a tank;
b. directing the wastewater to be treated to the tank and mixing the wastewater with the mixed liquor or activated sludge to form a mixed liquor stream;
c. directing the mixed liquor stream to a ballasted flocculation system;
d. injecting microsand ballast into the mixed liquor stream and the ballasted flocculation system and mixing the microsand ballast with the mixed liquor stream;
e. biologically removing soluble BOD in the mixed liquor stream;
f. monitoring the ammonia or ammonium concentration in the wastewater being treated;
g. when the ammonia or ammonium concentration in the wastewater exceeds a threshold value, injecting zeolite particles into the mixed liquor stream in the ballasted flocculation system and mixing the zeolite particles with the mixed liquor stream;
h. wherein the zeolite mixed with the mixed liquor stream is effective to remove ammonium from the mixed liquor stream through an ion exchange process;
i. removing suspended solids from the mixed liquor stream in the ballasted flocculation system by causing suspended solids in the mixed liquor stream to agglomerate around the microsand ballast and the zeolite particles;
j. wherein the ballasted flocculation system includes a settling tank and the method includes settling sludge in the settling tank wherein the sludge includes microsand and zeolite particles; and the method includes directing the sludge to a separator, separating the microsand from the sludge and zeolite particles; returning the separated microsand to the ballasted flocculation system; recycling at least a portion of the separated sludge and zeolite to the ballasted flocculation system or directing the separated sludge and zeolite to sludge-zeolite separation unit and separating the zeolite particles from the sludge; and
k. directing the separated zeolite to a zeolite regeneration unit and regenerating the zeolite particles, and thereafter returning the regenerated zeolite particles to the ballasted flocculation system or returning the separated zeolite particles to the ballasted flocculation system without regenerating the zeolite particles.

3. A method of removing soluble BOD and ammonium from influent wastewater comprising:
a. directing mixed liquor or activated sludge from an activated sludge system to a tank;
b. directing the influent wastewater into the tank and mixing the influent wastewater with the mixed liquor or activated sludge to form a mixed liquor stream;
c. directing the mixed liquor stream to a ballasted flocculation system;
d. biologically removing the soluble BOD in the mixed liquor stream in the ballasted flocculation system;
e. injecting microsand into the mixed liquor stream and the ballasted flocculation system and employing the microsand as a ballast to facilitate settling and removing suspended solids from the mixed liquor stream;
f. monitoring the ammonium concentration in the influent wastewater;
g. when the ammonium concentration of the influent wastewater exceeds a threshold value, injecting zeolite particles into the mixed liquor stream and into the ballasted flocculation system and mixing the zeolite particles with the mixed liquor stream;
h. after the zeolite particles have been injected into the mixed liquor stream, the method includes employing both the microsand and zeolite particles as ballast to facilitate settling and removing suspended solids from the mixed liquor stream;
i. wherein the zeolite particles mixed with the mixed liquor stream is effective to remove ammonium from the mixed liquor stream through an ion exchange process;
j. after the zeolite particles have been mixed with the mixed liquor stream, settling sludge wherein the sludge includes the microsand and used zeolite particles;
k. pumping the sludge including the microsand and used zeolite particles to a separator;
l. separating the sludge and used zeolite particles from the microsand; injecting the separated microsand back into the ballasted flocculation system where the separated microsand is mixed with the mixed liquor stream;
m. directing the sludge and used zeolite particles from the separator to a sludge-zeolite separation unit and separating the used zeolite particles from the sludge in the sludge-zeolite separation unit;
n. after the used zeolite particles have been separated from the sludge, directing the used zeolite particles to a zeolite regeneration unit;
o. regenerating the used zeolite particles in the zeolite regeneration unit to form regenerated zeolite particles; and
p. directing the regenerated zeolite particles from the zeolite regeneration unit back to the ballasted flocculation system and mixing the regenerated zeolite particles with the mixed liquor stream in the ballasted flocculation system.

4. The method of claim 3 wherein microsand is used as the ballast so long as the ammonium concentration in the influent wastewater is below the threshold limit.

5. The method of claim 3 wherein the separator for separating the sludge and zeolite particles from the microsand comprises a hydrocyclone, and the method includes producing an overflow from the hydrocyclone wherein the overflow comprises the sludge and the used zeolite particles.

6. The method of claim 3 including after separating the sludge and the used zeolite particles from the microsand, splitting the sludge and used zeolite particles into two streams and recycling one stream of the sludge and used zeolite particles to the ballasted flocculation system and directing the other stream of the sludge and used zeolite particles to the sludge-zeolite separation unit.

* * * * *